(12) United States Patent
Jeon et al.

(10) Patent No.: US 11,936,022 B2
(45) Date of Patent: Mar. 19, 2024

(54) BATTERY MODULE

(71) Applicant: SK Innovation Co., Ltd., Seoul (KR)

(72) Inventors: Hae Ryong Jeon, Daejeon (KR); Ho Yeon Kim, Daejeon (KR); Kang Gu Lee, Daejeon (KR); Seo Roh Rhee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 81 days.

(21) Appl. No.: 17/401,128

(22) Filed: Aug. 12, 2021

(65) Prior Publication Data

US 2022/0052392 A1    Feb. 17, 2022

(30) Foreign Application Priority Data

Aug. 13, 2020 (KR) .................. 10-2020-0101588

(51) Int. Cl.
*H01M 10/6551* (2014.01)
*H01M 10/653* (2014.01)
*H01M 50/211* (2021.01)
*H01M 50/233* (2021.01)
*H01M 50/276* (2021.01)
*H01M 50/30* (2021.01)

(52) U.S. Cl.
CPC ..... *H01M 10/6551* (2015.04); *H01M 10/653* (2015.04); *H01M 50/211* (2021.01); *H01M 50/233* (2021.01); *H01M 50/276* (2021.01); *H01M 50/394* (2021.01)

(58) Field of Classification Search
CPC .......... H01M 10/6551; H01M 10/653; H01M 50/276; H01M 50/394; H01M 50/211; H01M 50/233
See application file for complete search history.

(56) References Cited

U.S. PATENT DOCUMENTS

2021/0021008 A1 *  1/2021  Mummigatti ..... H01M 10/0481

FOREIGN PATENT DOCUMENTS

| KR | 10-2012-0097312 A | 9/2012 | |
|---|---|---|---|
| KR | 10-2014-0144843 A | 12/2014 | |
| KR | 10-2016-0041311 A | 4/2016 | |
| KR | 10-2018-0112630 A | 10/2018 | |
| KR | 10-2018-0117783 A | 10/2018 | |
| KR | 10-2018-0137211 A | 12/2018 | |
| KR | 10-2033101 B1 | 10/2019 | |
| WO | WO-9905731 A1 * | 2/1999 | ........ H01M 10/0413 |
| WO | WO-2013018286 A1 * | 2/2013 | .......... H01M 2/0245 |
| WO | WO-2021096020 A1 * | 5/2021 | .......... H01M 10/653 |

* cited by examiner

*Primary Examiner* — Jimmy Vo
(74) *Attorney, Agent, or Firm* — IP & T GROUP LLP (57) ABSTRACT

A battery module includes at least one cell group, and a heat dissipating member coupled to one side of the at least one cell group to externally dissipate heat generated in the at least one cell group, wherein the at least one cell group includes at least one battery cell stack, a flame retardant cover coupled to the battery cell stack to encase both side surfaces and an upper portion of the battery cell stack, and a flame retardant member disposed between an upper surface of the battery cell stack and the flame retardant cover and formed of a porous material.

13 Claims, 7 Drawing Sheets

BATTERY MODULE

CROSS-REFERENCE TO RELATED APPLICATION(S)

This application claims the benefit under 35 USC 119(a) of Korean Patent Application No. 10-2020-0101588 filed on Aug. 13, 2020 in the Korean Intellectual Property Office, the entire disclosure of which is incorporated herein by reference for all purposes.

BACKGROUND

1. Field

The present disclosure relates to a battery module.

2. Description of Related Art

Secondary batteries are chargeable and dischargeable unlike primary batteries and thus may be applied to various fields such as digital cameras, mobile phones, notebook computers, and hybrid vehicles. Secondary batteries include, for example, a nickel-cadmium battery, a nickel-metal hydride battery, a nickel-hydrogen battery, and a lithium secondary battery.

Among such secondary batteries, research into lithium secondary batteries having high energy density and discharge voltage has been conducted, and recently, lithium secondary batteries have been manufactured as flexible pouch-type battery cells and a plurality of pouch-type battery cells may be connected in the form of a module to be used.

Meanwhile, when the battery module is used for a long period of time, heat is generated by the battery, and in particular, when charged, an internal temperature may rise rapidly, and such an increase in the temperature of the battery shortens the life of the battery, degrades efficiency, and may cause ignition or explosion in a worst-case scenario.

In the related art, battery cells accommodated in a battery module are all arranged in a single space of the battery module. Thus, when flames occur in one battery cell, the flame readily propagates to other battery cells and spreads.

Therefore, there is a need for a battery module capable of suppressing propagation of flames or heat externally.

SUMMARY

Various embodiments provide a battery module capable of suppressing propagation of flames or heat when the flame is generated in a battery cell.

According to an exemplary embodiment, a battery module includes: at least one cell group; and a heat dissipating member coupled to one side of the at least one cell group to externally dissipate heat generated in the at least one cell group, wherein the at least one cell group includes at least one battery cell stack; a flame retardant cover coupled to the battery cell stack to encase both side surfaces and an upper portion of the battery cell stack; and a flame retardant member disposed between an upper surface of the battery cell stack and the flame retardant cover and formed of a porous material.

The flame retardant cover may include side surface portions coupled to both side surfaces of the battery cell stack and an upper surface portion connecting the two side surface portions and disposed on the upper portion of the battery cell stack, and wherein at least one gas outlet may be provided on the upper surface portion of the flame retardant cover.

The at least one gas outlet may be disposed in a region facing to an electrode lead of the battery cell.

The upper surface portion may include a protrusion protruding in a direction in which the electrode lead of the battery cell is disposed, and the at least one gas outlet may be disposed in the protrusion.

The flame retardant cover may be formed of a sheet including mica.

The flame retardant cover may be formed of any one selected from the group consisting of stainless steel, graphite, graphene, carbon fiber reinforced plastics (CFRP), glass fiber reinforced plastics (GFRP), and non-woven compressible fibers.

The flame retardant member may be formed as a foam pad including mica.

The flame retardant member may be disposed in a compressed volume state between the battery cell and the flame retardant cover, and pressure is exerted on the battery cell through a restoring force of the flame retardant member.

The battery cell may include an accommodating portion accommodating an electrode assembly and a sealing portion disposed along a circumference of the accommodating portion, and at least one of the sealing portions may be pressurized by the flame retardant member and may be in close contact with the accommodating portion.

The battery module may further include: a case disposed above the flame retardant cover and facing the upper surface portion of the flame retardant cover, wherein the case may have at least one discharge hole for discharging gas formed in the battery cell.

The at least one discharge hole may be disposed to not overlap with the gas outlet.

The battery module may further include: a heat transfer member disposed between the battery cell and the heat dissipating member.

The heat transfer member may include any one of thermal grease, a thermally conductive adhesive, and a thermally conductive pad.

According to an exemplary embodiment, a battery module includes: a battery cell stack formed by stacking one or a plurality of battery cells; a flame retardant cover disposed above the battery cell stack and including at least one gas outlet; and a case accommodating the battery cell stack and the flame retardant cover therein, wherein the case includes at least one discharge hole formed on a surface thereof facing the flame retardant cover.

The at least one discharge hole may be disposed to not overlap with the gas outlet.

The battery module may further include: a flame retardant member as a foam disposed between the battery cell stack and the flame retardant cover to block spread of flames.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Prior to the description of the present invention, terms and words used in the present specification and claims to be described below should not be construed as being limited to ordinary or dictionary terms, and should be construed in accordance with the technical idea of the present invention based on the principle that the inventors can properly define their own inventions in terms of terms in order to best explain the invention. Therefore, the embodiments described in the present specification and the configurations illustrated in the drawings are merely the most preferred embodiments of the present invention and are not intended to represent all of the technical ideas of the present invention, and thus should be understood that various equivalents and modifications may be substituted at the time of the present application.

Hereinafter, embodiments of the present invention will be described in detail with reference to the accompanying drawings. In this case, in the drawings, the same components are denoted by the same reference symbols as possible. Further, the detailed description of well-known functions and constructions which may obscure the gist of the present invention will be omitted. For the same reason, some of the elements in the accompanying drawings are exaggerated, omitted, or schematically illustrated, and the size of each element does not entirely reflect the actual size.

In addition, in the present disclosure, the expressions such as an upper side, a lower side, a side face, and the like, are described based on the drawings and may be expressed differently when the direction of the corresponding object is changed.

Figure 1:
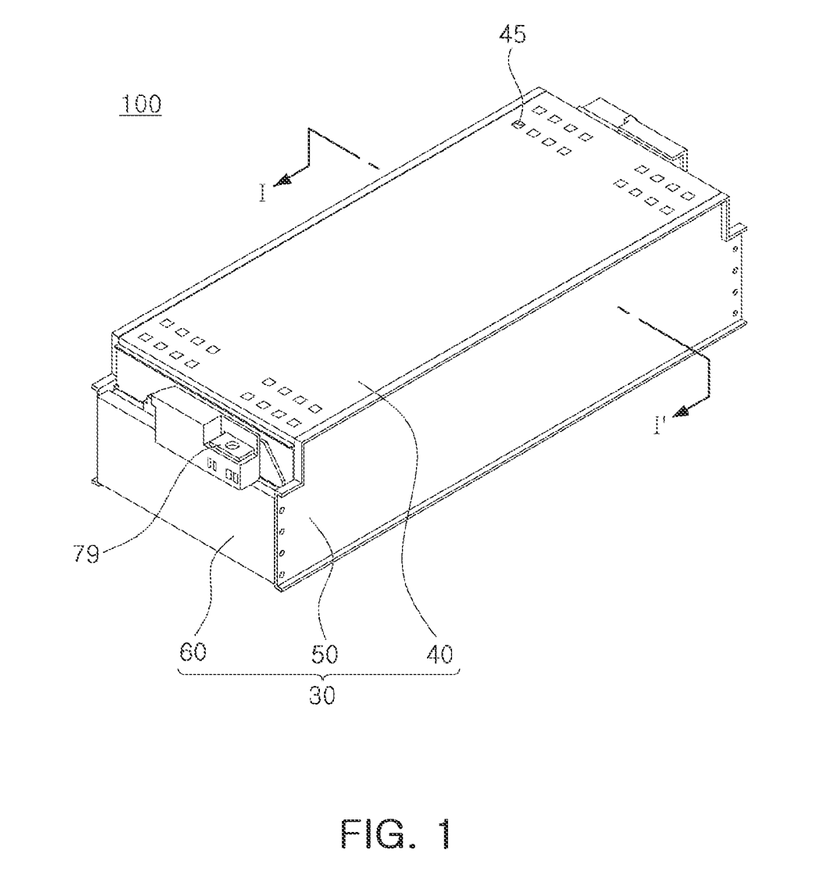
FIG. 1 is a perspective view schematically illustrating a battery module according to an exemplary embodiment in the present disclosure.
Figure 2:
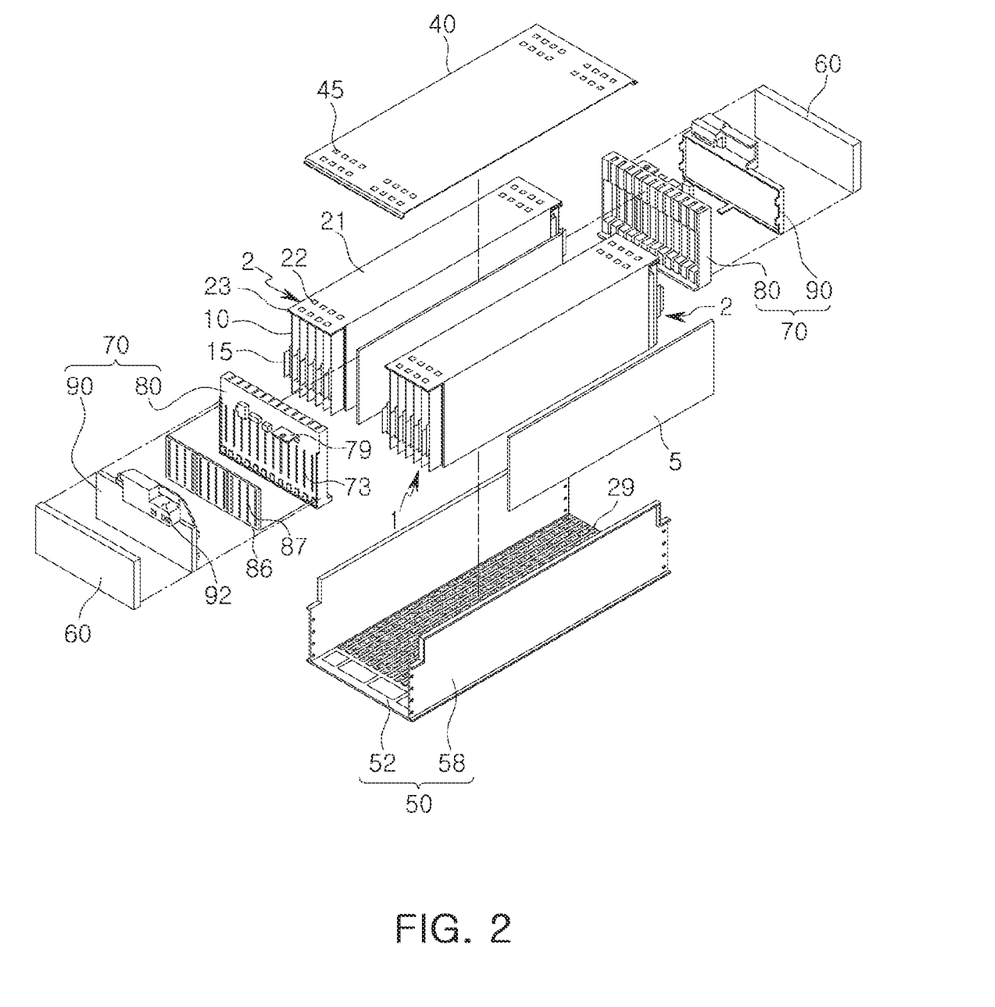
FIG. 2 is an exploded perspective view of the battery module shown in FIG. 1.
Figure 3:
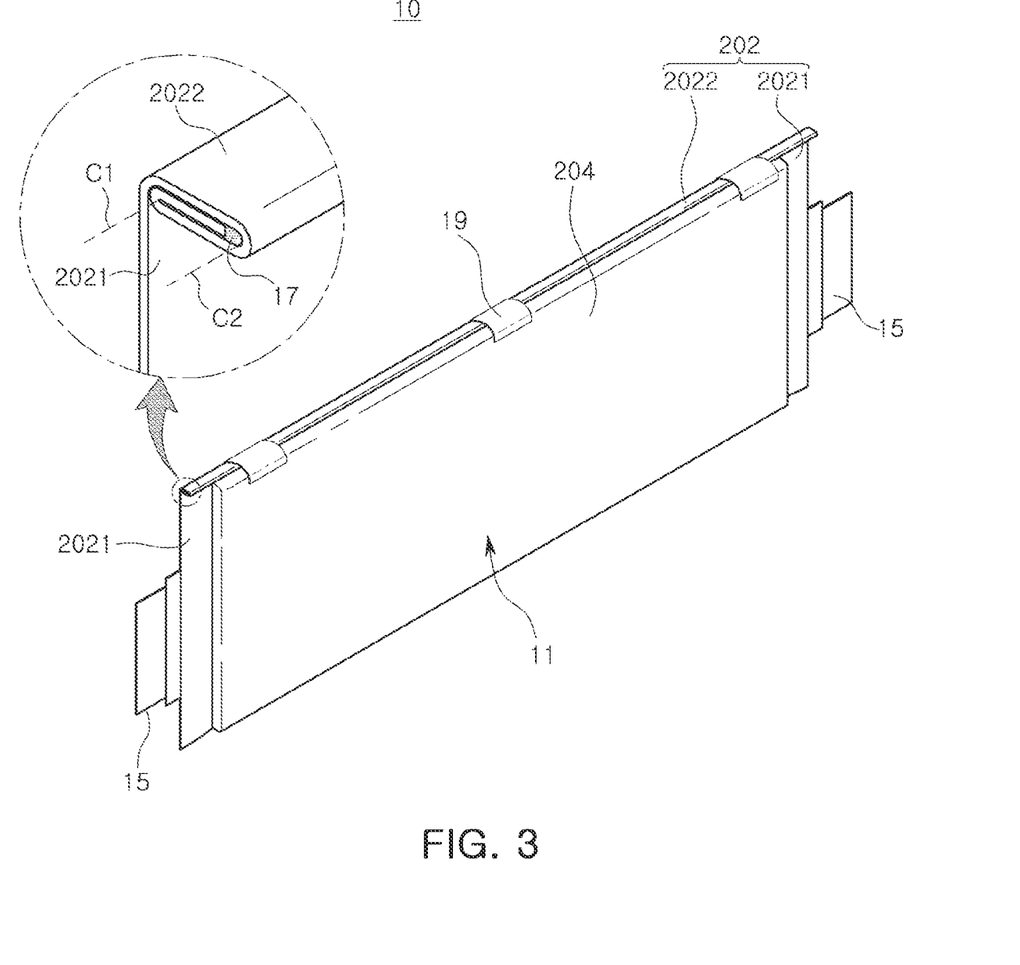
FIG. 3 is an enlarged perspective view of a battery cell of FIG. 2.
Figure 4:
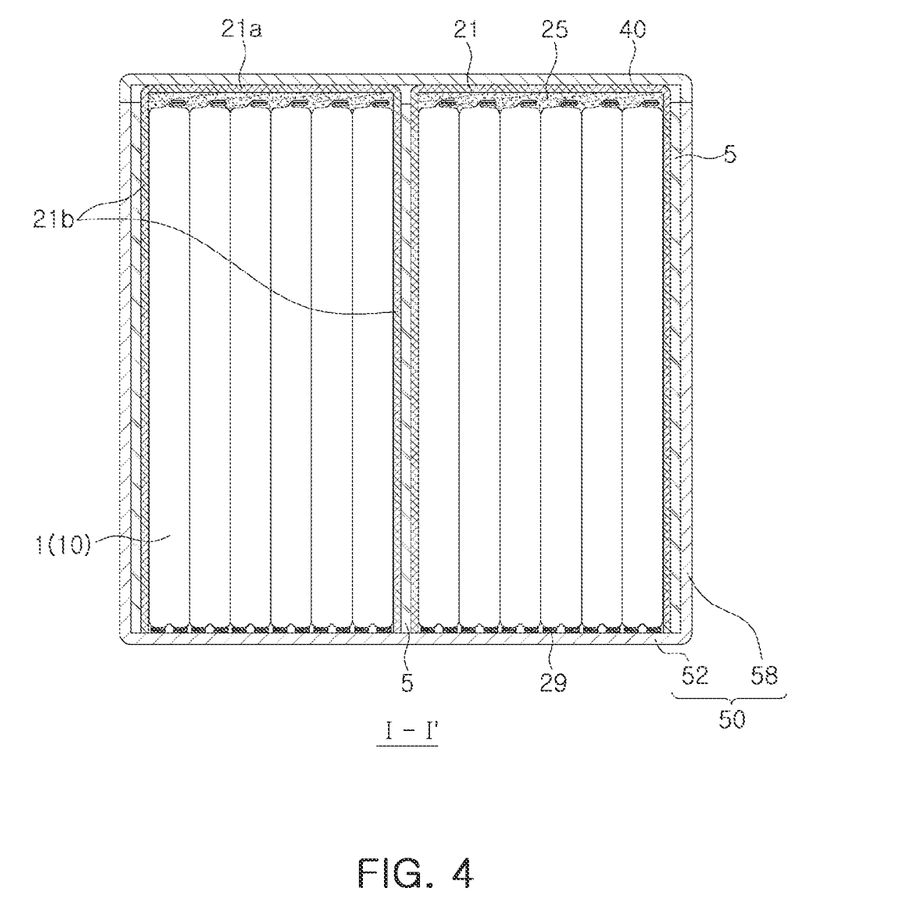
FIG. 4 is a cross-sectional view taken along line I-I' of FIG. 1.

FIG. 1 is a perspective view schematically illustrating a battery module according to an exemplary embodiment in the present disclosure, FIG. 2 is an exploded perspective view of the battery module shown in FIG. 1, FIG. 3 is an enlarged perspective view of a battery cell of FIG. 2, and FIG. 4 is a cross-sectional view taken along line I-I' of FIG. 1.

Referring to FIGS. 1 through 4, a battery module 100 of the present exemplary embodiment may include a plurality of cell groups 2 having a battery cell stack 1, a case 30, and a bus bar assembly 70.

The battery cell stack 1 is formed by stacking a plurality of battery cells 10 shown in FIG. 3. In the present exemplary embodiment, the battery cells 10 are stacked in a left-right direction (or a horizontal direction). However, the battery cells 10 may also be configured to be stacked in an up-down direction as necessary.

Each of the battery cells 10 may be a pouch-type secondary battery, and may have a structure in which an electrode lead 15 protrudes externally.

The battery cell 10 may be configured such that an electrode assembly 7 (see FIG. 5) is accommodated in a pouch 11.

The electrode assembly includes a plurality of electrode plates and electrode tabs and is accommodated in a pouch 11. Here, the electrode plates may include a positive plate and a negative plate, and the electrode assembly may be configured in a form in which the positive plate and the negative plate are stacked so that wide surfaces thereof face each other with a separator interposed therebetween.

The positive plate and the negative plate are formed by applying an active material slurry to a current collector, and the slurry may be generally formed by adding active material particles, an auxiliary conductor, a binder, a plasticizer, and the like, to a solvent, and stirring the resultant solvent.

In addition, in the electrode assembly, a plurality of positive plates and a plurality of negative plates are stacked in a vertical direction. In this case, an electrode tab is provided on each of the plurality of positive plates and the plurality of negative plates, and electrode tabs having the same polarity may be in contact with each other and connected to the same electrode lead 15.

In the present exemplary embodiment, two electrode leads 15 may be disposed to face in opposite directions to each other.

The pouch 11 may be formed in a shape of a container to form an exterior of the battery cell 10 and may provide an internal space in which the electrode assembly and an electrolyte (not shown) are accommodated. In this case, part of the electrode lead 15 of the electrode assembly may be exposed externally of the pouch 11.

The pouch 11 may be divided into a sealing portion 202 and an accommodating portion 204.

The accommodating portion 204 may be formed in a container shape and provide a quadrangular internal space. The electrode assembly and the electrolyte may be accommodated in the internal space of the accommodating portion 204.

The sealing portion 202 is a portion of the pouch 11 bonded to seal a circumference of the accommodating portion 204. Accordingly, the sealing portion 202 is formed in a flange shape extending outward from the accommodating portion 204 formed in the shape of a container, and thus the sealing portion 202 may be disposed on an outer portion of the accommodating portion 204.

A heat-sealing method may be used to bond the pouch 11, but is not limited thereto.

In addition, in the present exemplary embodiment, the sealing portion 202 may be divided into a first sealing portion 2021 in which the electrode lead 15 is disposed and a second sealing portion 2022 in which the electrode lead is not disposed.

In the present exemplary embodiment, the pouch 11 may be formed using a single exterior material. More specifically, after one or two receiving portions are formed in one exterior material, the exterior material may be folded so that the receiving portions form a single space (i.e., accommodating portion), thereby completing the pouch 11.

In the present exemplary embodiment, the accommodating portion 204 may be formed in a quadrangular shape. In addition, the sealing portion 202 formed by bonding the exterior material may be provided on the outer portion of the accommodating portion 204. Accordingly, in the battery cell 10 of the present exemplary embodiment, it is not necessary to form the sealing portion 202 on a surface in which the exterior material is folded. Therefore, In the present exemplary embodiment, the sealing portion 202 is only provided on three of the four surfaces forming the outer portion of the accommodating portion 204, and the sealing portion is not disposed on any one (lower surface in FIG. 3) of the outer portion of the accommodating portion.

In the present exemplary embodiment, since the electrode leads 15 are arranged to face in the mutually opposing directions, the two electrode leads 15 may be disposed on the sealing portions 202 formed on different sides. Therefore, the sealing portion 202 of present exemplary embodiment may include two first sealing portions 2021 in which the electrode lead 15 is disposed and one second sealing portion 2022 in which the electrode lead 15 is not disposed.

In addition, in the battery cell 10 of present exemplary embodiment, the sealing portion 202 may be configured to be folded at least once to increase bonding reliability of the sealing portion 202 and minimize a volume of the sealing portion 202 occupied by the sealing portion 202 in the module of the sealing portion 202.

More specifically, the battery cell 10 according to the present exemplary embodiment may be configured such that only the second sealing portion 2022, in which the electrode lead 15 is not disposed in the sealing portion 202, is folded twice.

The second sealing portion 2022 may be folded in a direction to reduce an area of the battery cell 10. For example, in the present exemplary embodiment, the bending lines C1 and C2, which are lines on which the second sealing portion 2022 is folded, are arranged parallel to the outer portion of the accommodating portion 204, and at least a portion of the second sealing portion 2022 may be folded along the bending lines C1 and C2. Accordingly, the second sealing portion 2022 folded at least once may have the same width as a whole.

The second sealing portion 2022 may be folded twice by 180° along the first bending line C1 and the second bending line C2 shown in FIG. 3 and then folded again by 90° along the first bending line C1 so as to be fixed by a fixing member 19.

Here, an inside of the second sealing portion 2022 may be filled with an adhesive member 17, and thus, a shape of the second sealing portion 2022 folded twice by the adhesive member 17 may be maintained. The adhesive member 17 may be formed of an adhesive having high thermal conductivity. For example, the adhesive member 17 may be formed of epoxy or silicon, but is not limited thereto.

In addition, in the battery cell 10 of the present exemplary embodiment, the second sealing portion 2022 may be in close contact with and fixed to the accommodating portion 204 through the fixing member 19.

Figure 5:
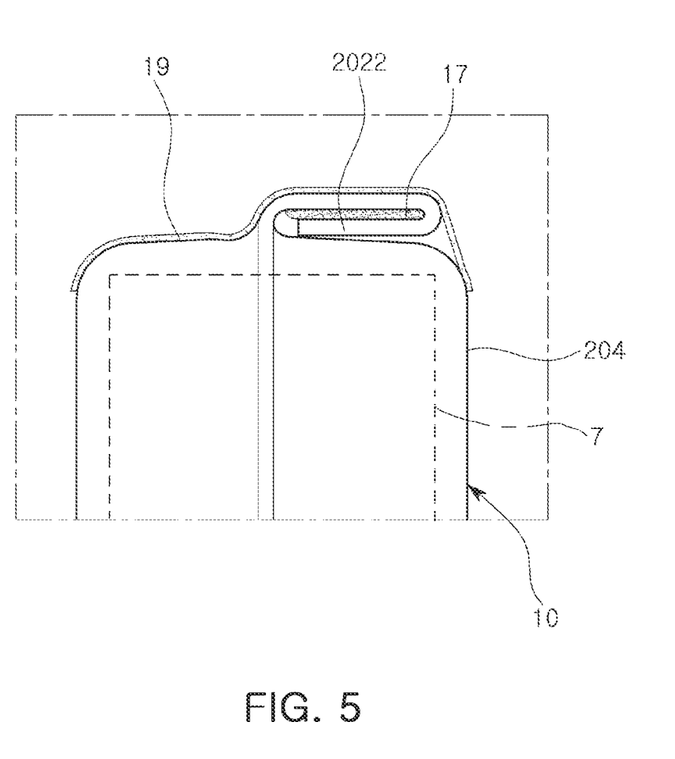
FIG. 5 is a partial side view of the battery cell shown in FIG. 3.

FIG. 5 is a partial side view of the battery cell shown in FIG. 3. Referring to FIG. 3, the fixing member 19 may be attached along a surface of the accommodating portion 204 and the second sealing portion 2022 of the battery cell 10 to allow the second sealing portion 2022 to be in close contact with and fixed to the accommodating portion 204.

An adhesive tape may be used as the fixing member 14, but is not limited thereto. For example, after applying an adhesive solution to the surface of the battery cell 10, a film or sheet may be attached to be used as the fixing member 19. In addition, the fixing member 19 may be provided in the form of a clip.

In the present exemplary embodiment, a case of fixing the second sealing portion 2022 by disposing three fixing members 19 spaced apart from each other is used as an example. However, the present disclosure is not limited thereto, and the number of fixing members 19 may be variously changed as necessary. It is also possible to attach one long adhesive tape to the entire second sealing portion 2022.

In addition, the fixing member 19 of the present disclosure may be variously modified.

Figure 6:
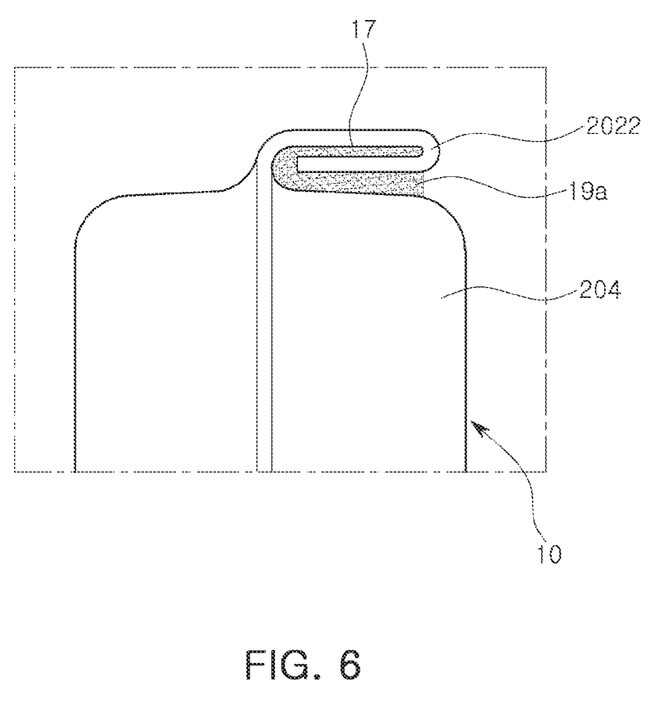
FIGS. 6 and 7 are partial side views of a battery cell according to another exemplary embodiment in the present disclosure.
Figure 7:
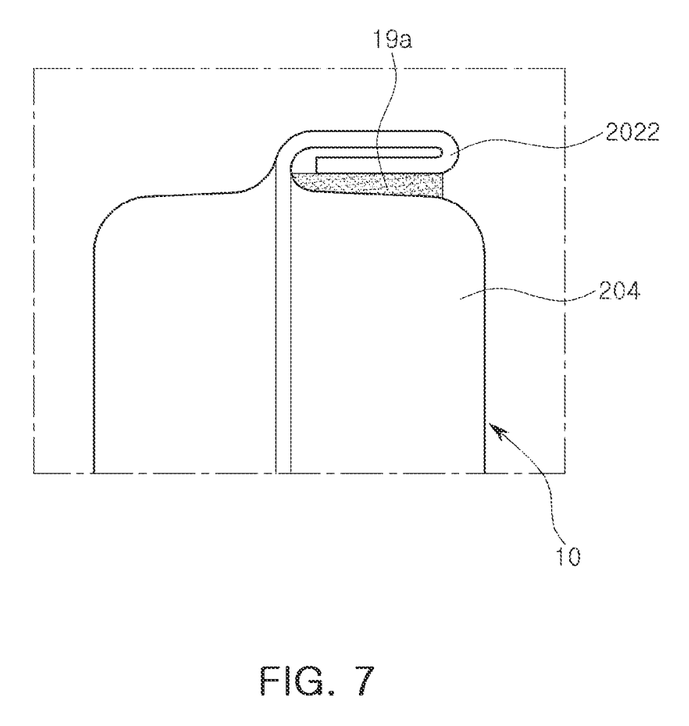

FIGS. 6 and 7 are partial side views of a battery cell according to another exemplary embodiment in the present disclosure, respectively. As shown in FIGS. 6 and 7, for example, a fixing member 19a may be inserted and disposed between the second sealing portion 2022 and the accommodating portion 204 to allow the second sealing portion 2022 to be in close contact with and fixed to the accommodating portion 204.

Referring to FIG. 6, the second sealing portion 2022 is in close contact with and fixed to the accommodating portion 204 by the fixing member 19a. When the second sealing portion 2022 is fixed in this manner, the fixing member 19a may be formed of the same material as the adhesive member 17. However, the present disclosure is not limited thereto, and a material different from the adhesive member 17 may also be used. For example, the fixing member 19a may be formed of a double-sided adhesive tape or may be formed by applying a liquid adhesive.

Meanwhile, as shown in FIG. 7, the adhesive member 17 disposed in the second sealing portion 2022 may be omitted as necessary. Referring to FIG. 7, the fixing member 19a may be disposed only between the second sealing portion 2022 and the accommodating portion 204 and an adhesive member is not provided. In the case of omitting the adhesive member, a manufacturing process may be minimized.

The battery cell 10 configured as described above may be a battery which can be charged and discharged, and specifically, may be a lithium ion (Li-ion) battery or a nickel metal hydride (Ni-MH) battery.

The battery cells 10 are disposed to be perpendicular to a bottom surface within a flame retardant cover 21 to be described later and are stacked in a left-right direction. In addition, at least one buffer pad 5 may be disposed between the stacked battery cells 10 or between the cell group 2 and the case 30.

In the present exemplary embodiment, the buffer pad is disposed between one or cell groups 2 and between the cell group 2 and the case 30 but is not limited thereto.

The buffer pad 5 is compressed and elastically deformed when the battery cell 10 is expanded. Accordingly, expansion of the entire volume of the battery cell stack 1 or the cell group 2 may be suppressed. To this end, the buffer pad 5 may be formed of foam of a polyurethane material, but is not limited thereto. Also, the buffer pad may be omitted to increase energy density of the battery module.

The battery cell stack 1 of the present exemplary embodiment may be divided into a plurality of groups and distributed in a plurality of cell groups 2.

In addition, each cell group 2 may include the battery cell stack 1, the flame retardant cover 21, and a flame retardant member 25.

In the present exemplary embodiment, six battery cells 10 are stacked and disposed in one cell group 2. However, the present disclosure is not limited thereto, and a larger or smaller number of battery cells 10 may be configured to be included in one cell group 2 as necessary.

The flame retardant cover 21 is coupled to the battery cells in a form encasing the battery cells 10 constituting the cell group 2 to form an exterior of the cell group 2.

Flame retardant cover 21 may be formed of a member having flame retardancy or flame resisting performance. Here, the flame retardancy performance refers to performance to prevent expansion of combustion, and flame resisting performance refers to performance of a material that does not burn readily even if the material is set aflame. Therefore, the flame retardant cover 21 may have flammability to a degree that does not become a factor of expansion of combustion or may have properties of not being burned.

The flame retardant cover 21 may include a continuous piece of sheet. As shown in FIG. 4, the flame retardant cover 21 may be formed in a "∩" shape to provide an insulation space in which the battery cells 10 are arranged. Here, the insulation space is a space formed by the flame retardant cover 21 and a lower plate 52, and one flame retardant cover 21 is disposed in one insulation space. Therefore, the flame retardant cover 21 may be provided as many as the number of insulation spaces.

The flame retardant cover 21 may include two side portions 21b coupled to both sides of the battery cell stack 1 and an upper surface portion 21a disposed on top of the battery cell stack 1 and connecting the two side portions 21b.

The side surface portion 21b may be in close contact with a large surface of the accommodating portion 204 constituting both sides of the battery cell stack 1. For example, the side surface portion 21b may be bonded to be in surface contact with the accommodating portion 204 of the battery cell 10.

The upper surface portion 21a is disposed to face an upper surface of the battery cell stack 1. Here, the upper surface portion 21a may be disposed to be spaced apart from the upper surface of the battery cell stack 1 by a predetermined distance, and the flame retardant member 25 may be inserted between the upper surface portion 21a and the battery cell stack 1.

The flame retardant cover 21 is provided to block propagation of flame or heat based on frame, which occurs in any one battery cell 10, to another cell group 2. Accordingly, in the present exemplary embodiment, insulation spaces of each cell group 2 may be spaced apart from each other by a predetermined distance.

Meanwhile, a lower surface of the accommodating portion 204 of the battery cell 10 is configured to contact the lower plate 52 via a heat transfer member 29. Therefore, even if the flame retardant cover 21 is not disposed on the lower surface of the accommodating portion 204, it is possible to block propagation of flames to the lower portion of the accommodating portion 204 by the lower plate 52 and the heat transfer member 29.

As described above, in the present exemplary embodiment, each of the cell groups 2 is distributed to and disposed in an insulation space formed by the flame retardant cover 21 and the lower plate 52. Accordingly, flames occurring in any one battery cell 10 may be effectively prevented from spreading to another cell group 2.

In addition, since the lower surface of the accommodating portion 204 of the battery cell is used as a path for discharging heat from the battery cell 10 externally, if the flame retardant cover 21 is disposed on the lower surface of the accommodating portion 204, heat dissipation of the battery cell 10 may not be performed smoothly.

Accordingly, the battery module of present exemplary embodiment is coupled to the battery cell stack 1 so that only three sides including the upper portion and the side surfaces excluding the lower surface of the battery cell stack 1 are encased.

In addition, the flame retardant cover 21 may include at least one gas outlet 22.

The gas outlet 22 may be formed as a through hole penetrating the flame retardant cover 21, and one or a plurality of gas outlets 22 may be provided.

In the present exemplary embodiment, the gas outlet 22 may be disposed on the upper surface portion 21a of the flame retardant cover 21 in order to discharge the gas as effectively as possible. Through various experiments, when the battery cells 10 are disposed such that three surfaces are sealed and the second sealing portion 2022 is positioned above, like the battery cell 10 according to the exemplary embodiment in the present disclosure, flames that may occur in the battery cell 10 is mostly diffused upwards. Here, it was confirmed that most of the gases occurring together with the flame were also directed toward the upper portion of the battery cell stack 1.

Therefore, when the gas outlet 22 is formed on the upper surface portion 21a of the flame retardant cover 21 located on top of the battery cell stack 1, gas may be more effectively discharged externally of the cell group 2.

In addition, through various experiments, it was measured that most of the flame occurring in the battery cell 10 occurs in a position adjacent to the electrode lead 15.

Accordingly, the gas outlet 22 of the present exemplary embodiment may be concentrated in a region facing to the electrode lead 15 of the battery cell 10 in the upper surface portion 21a.

To this end, the upper surface portion 21a may be formed to be longer than the side surface portion 21b. As shown in FIG. 2, the upper surface portion 21a may include a protrusion 23 protruding by a predetermined distance longer than the side surface portion 21bin the direction in which the electrode leads 15 are disposed.

The protrusion 23 may be configured to protrude more than the first sealing portion 2021 and the electrode lead 15. In addition, at least one gas outlet 22 may be disposed in the protrusion 23.

Through this configuration, it is possible to effectively block flames occurring outside the first sealing portion 2021 of the battery cell 10 and discharge gas.

Meanwhile, the protrusion 23 may be disposed between an insulating cover 80 and a second plate 40 to be described later.

Since the flame retardant cover 21 should block the propagation of the flame, the flame retardant cover 21 may be formed of a flame retardant material, a nonflammable material, or a fireproof heat insulating material. In the present exemplary embodiment, as the flame retardant cover 21, a sheet including mica may be used. However, the present exemplary embodiment is not limited thereto and any one of a variety of materials such as stainless steel, graphite, graphene, carbon fiber reinforced plastics (CFRP), glass fiber reinforced plastics (GFRP), non-woven compressible fibers, etc., may be used.

In addition, the flame retardant cover 21 may be provided by imparting flame retardancy performance or flame resisting performance using a chemical in a combustible material such as fiber.

In addition, since the flame retardant cover 21 is in direct contact with the battery cell 10, the flame retardant cover 21 may be formed of an electrically insulating material. Therefore, when the flame retardant cover 21 is formed of stainless steel, an insulating material may be coated on an inner surface of the flame retardant cover 21 in contact with the battery cell 10.

For example, as the flame retardant cover 21, a material including ceramic to have fire resistance/heat insulation, a material in the form of a sheet formed by applying a gel-type insulating material including sodium silicate on a thin film or using the same, or a fiber fireproof insulator such as glass fiber or ceramic wool may be used.

In addition, the flame retardant cover 21a may be formed of a rubber material containing expandable graphite so that graphite may be rapidly expanded when exposed to heat to form a heat insulating layer.

The flame retardant member 25 may be disposed between the upper surface of the battery cell stack 1 and the flame retardant cover 21.

The flame retardant member 25 may include a pad or sheet in the form of a foam, which is a porous material therein. Accordingly, the flame retardant member 25 may be disposed between the battery cell stack 1 and the flame retardant cover 21, in a compressed state by a predetermined volume.

The flame retardant member 25 is provided to prevent flames from spreading in an upward direction of the battery cell 10 as the second sealing portion 2022 of the battery cell is damaged.

Therefore, the flame retardant member 25 of present exemplary embodiment may be formed of a flame retardant material, a non-flammable material, or a fire-resistant insulating material. For example, the flame retardant member 25 may be formed of a foam pad including mica.

However, the present disclosure is not limited thereto, and various materials may be used as long as they have a flame retardant function and may be formed as a foam pad. For example, the flame retardant member 25 may be formed of one of the materials constituting the flame retardant cover 21.

As the flame retardant member 25 of the present exemplary embodiment is configured in the form of a foam pad, diffusion of flames may be blocked, while gas may be allowed to pass therethrough. Accordingly, gas occurring with the flame in the battery cell 10 may pass through the flame retardant member 25 and then be discharged externally of the cell group 2 through the gas outlet 22 of the flame retardant cover 21.

In addition, since the flame retardant member 25 of present exemplary embodiment is disposed between the battery cell stack 1 and the flame retardant cover 21 in a compressed state by a certain volume, the second sealing portions 2022 disposed on the top of the battery cell stack 1 may be pressurized toward the accommodating portion 204 through a restoring force of the flame retardant member 25, and this state may be continuously maintained.

Accordingly, it is possible to prevent the second sealing portion 2022 from being easily unfolded (spread) or opened due to an increase in gas inside the battery cell 10.

Through such a configuration, in the battery module 100 according to the present exemplary embodiment, the battery cells 10 are distributed and disposed in insulation spaces isolated for each cell group 2. Therefore, even if flames occur in one cell group 2, the flame may be prevented from propagating to another cell group 2. At the same time, gas occurring in the battery cell 10 may be quickly discharged externally of the cell group 2.

The case 30 defines an exterior of the battery module 100, and is disposed outside the plurality of battery cells 10 to protect the battery cells 10 from an external environment. At the same time, the case 30 of the present exemplary embodiment may also be used as a heat dissipating member of the battery module 100.

The case 30 of the present exemplary embodiment may include a first plate 50 disposed on one side of the battery cell stack 1, a second plate 40 disposed on the other side of the battery cells 10, and a side cover 60 disposed on the side of the cells 10 on which the electrode leads 15 are disposed.

The first plate 50 may include a lower plate 52 disposed under the battery cell stack 1 to support a lower surface of the battery cell stack 1 and a side plate 58 supporting a side surface of the cell group 2.

The side plate 58 may be formed to extend from both sides of the lower plate 52. However, if necessary, it is also possible to configure the side plate 58 and the lower plate 52 as independent components.

In the present exemplary embodiment, a buffer pad 5 is disposed between the side plate 58 and the cell group 2. However, the present disclosure is not limited thereto, and various modifications may be made, such as omitting the buffer pad 5 or disposing a cooling member, if necessary.

The first plate 50 configured as described above may be formed of a material having high thermal conductivity such as metal. For example, the first plate 50 may be formed of aluminum. However, the present disclosure is not limited thereto, and various materials may be used as long as the materials have thermal conductivity similar to metal, even if it is not a metal.

The second plate 40 is disposed above the battery cell stack 1 and is disposed to face the upper surface of the battery cell stack 1. In addition, the second plate 40 may be provided in a flat plate shape and may be fastened to an upper end of the side plate 58 of the first plate 50. Therefore, when the second plate 40 is fastened to the first plate 50, the second plate 40 and the first plate 50 may have a shape of a tubular member having an empty inside.

Like the first plate 50, the second plate 40 may be formed of a material having high thermal conductivity. Specifically, the second plate 40 may be formed of a material such as metal, and more specifically, may be formed of aluminum. However, the present disclosure is not limited thereto, and various materials having high thermal conductivity may be used within the scope of the present disclosure.

The first plate 50 and the second plate 40 may be coupled by welding or the like. However, the present disclosure is not limited thereto, and various other methods may also be used. That is, the first plate 50 and the second plate 40 may be coupled by a sliding method or using a fixing member such as a bolt or a screw.

In addition, the second plate 40 of the present exemplary embodiment may include at least one discharge hole 45. The discharge hole 45 may be used as a passage for discharging gas discharged from the cell group 2 externally of the battery module 100. Therefore, a size and shape thereof are not limited if gas is discharged smoothly.

Meanwhile, if the discharge hole 45 of the present exemplary embodiment is disposed to overlap the gas outlet 22 of the cell group 2, flames partially diffused through the gas outlet 22 may be diffused externally of the case 30 through the discharged hole 45. Accordingly, in the battery module 100 of present exemplary embodiment, the discharge hole 45 is disposed to not overlap the gas outlet 22 of the cell group 2.

Here, the expression of not overlapping each other may mean that, when the gas outlet 22 of the cell group 2 is projected onto the second plate 40, a position of the projected gas outlet 22 and the discharge hole 45 do not overlap each other.

However, the configuration of the present disclosure is not limited thereto, and when it is possible to completely block the spread of the flame through the flame retardant member 25, etc., the discharge hole 45 and the gas outlet 22 may be arranged to overlap each other.

In the present exemplary embodiment, a plurality of discharge holes 45 are disposed to be spaced apart from each other by a predetermined interval, and are disposed above an region in which the electrode leads 15 of the battery cell 10 are disposed. However, the present disclosure is not limited thereto, and a single discharge hole 45 having a large size may be formed or additional discharge holes 45 may be disposed in various positions. In addition, various modifications may be made, such as disposing a mesh or net-shaped member in the discharge hole to block the spread of flames.

The side cover 60 may be coupled to both sides on which the electrode leads 15 of the battery cells 10 are disposed.

As shown in FIG. 2, the side cover 60 may be coupled to the first plate 50 to configure an overall exterior of the battery module 100 together with the first plate 50 and the second plate 40.

The side cover 60 may be formed of a metal and may be manufactured by a die-casting method, but is not limited thereto. The side cover 60 may be formed of an insulating material such as a resin.

The side cover 60 may be coupled to the first plate 50 through a fixing member such as rivets, screws, bolts, and snap fits. However, the present disclosure is not limited thereto, and the side cover 60 may be coupled to the first plate 50 in a sliding manner or may be combined using laser welding, spot welding, or an adhesive.

A bus bar assembly 70 may be interposed between the side cover 60 and the battery cell stack 1.

The bus bar assembly 70 may be disposed on the side surfaces of the battery cells 10 on which the electrode leads 15 are disposed, and may include the insulating cover 80, a fixing plate 90, and a bus bar 86.

The electrode leads 15 of the battery cells 10 may pass through the insulation cover 80 and be interconnected outside the insulation cover 80. To this end, the insulating cover 80 may include a plurality of through holes 73 into which the electrode leads 15 are inserted.

In addition, the insulating cover 80 may include a connection terminal 79 for electrically connecting the battery cells 10 to the outside. The connection terminal 79 may be exposed externally through a through hole 92 formed in the fixing plate 90. Accordingly, the through hole 62 of the fixing plate 90 may have a shape corresponding to a size and shape of the connection terminal 79.

In the present exemplary embodiment, the connection terminal 79 may be formed of a conductive member and may be electrically connected to or bonded to at least one bus bar 86.

In addition, the insulating cover 80 may include a circuit board (e.g., a printed circuit board (PCB)) and a plurality of electronic devices mounted on the circuit board, through which a function of sensing a voltage of the battery cell 10 may be performed.

The fixing plate 90 is coupled to an outer surface of the insulating cover 80. In addition, the bus bar 86 is disposed between the fixing plate 90 and the insulating cover 80, and the fixing plate 90 is formed to have an area covering the entirety of the bus bar 86.

The fixing plate 90 has a through hole 92 into which the connection terminal 79 is inserted. The fixing plate 90 may be fitted to the insulating cover 80. However, the configuration of the present disclosure is not limited thereto, and various modifications may be made, such as coupling the fixing plate 90 and the insulating cover 80 using a separate fixing member such as a screw.

The bus bar 86 may be formed as a metal plate and coupled to an outer surface of the insulating cover 80. The battery cells 10 may be electrically connected to each other through the bus bar 86 and may be electrically connected to an external element of the battery module 100 through the bus bar 86 and the connection terminal 79.

To this end, the bus bar 86 may include a plurality of through holes 87 into which the electrode leads 15 are inserted, and the electrode leads 15 may be inserted into the through holes 87 of the bus bar 86 and then bonded to the bus bar 86 through a method such as welding. Accordingly, at least a portion of the end of the electrode lead 15 may completely penetrate the bus bar 86 and be exposed externally of the bus bar 86.

In the present exemplary embodiment, the connection terminal 79 is configured as a member manufactured separately from the bus bar 86, but is not limited thereto, and the connection terminal 79 may be integrally configured with the bus bar 86. For example, one side of the bus bar 86 may partially protrude and then bent and used as the connection terminal 79. That is various modification may be made.

Meanwhile, as shown in FIG. 4, a heat transfer member 29 may be disposed between a lower surface of the battery cell stack 1 and the first plate 50.

The heat transfer member 29 may be disposed to be in direct contact with the lower surface of the battery cell 10. Accordingly, the heat transfer member 29 may promptly transfer heat generated by the battery cell 10 to the case 30. To this end, the heat transfer member 29 may be formed of a material having high thermal conductivity. For example, the heat transfer member 29 may be formed of any one of a thermal adhesive such as a thermal grease or an epoxy resin and a thermally conductive pad, but is not limited thereto.

The heat transfer member 29 may be disposed on the inner surface of the case 30 in the form of a pad or may be applied as a liquid or a gel to the inner surface of the case 30.

The heat transfer member 29 of the present exemplary embodiment may be formed of a material having high insulating properties and having a dielectric strength in the range of 10 to 30 KV/mm, for example.

Accordingly, in the battery module 100 according to the present exemplary embodiment, even if insulation is partially destroyed in the battery cell 10, insulation between the battery cell 10 and the case 30 may be maintained by the heat transfer member 29 disposed near the battery cell 10.

In addition, since the heat transfer member 29 is disposed to fill a space between the battery cells 10 and the case 30, overall rigidity of the battery module 100 may be reinforced.

Meanwhile, In the present exemplary embodiment, a case in which the heat transfer member 29 is disposed only under the battery cell 10 is taken as an example. However, the configuration of the present disclosure is not limited thereto, and the heat transfer member 29 may be additionally disposed in various positions as necessary.

The battery module 100 of the present exemplary embodiment may discharge heat generated by the battery cell externally through the lower plate 52. Accordingly, the lower plate 52 may function as a heat dissipating member dissipating heat externally.

The battery module according to the present exemplary embodiment configured as described above may prevent battery cells of other cell groups from being directly exposed to flames even if the flame occurs in any one battery cell. In addition, rapid heat transfer to other battery cells may be suppressed. Therefore, diffusion of a flam or heat may be suppressed.

In addition, gas may be easily discharged externally of the battery module, while diffusion of flames is blocked through the flame retardant member and the gas outlet.

In addition, since the flame retardant member pressurizes the sealing portion of the battery cell with a constant pressure to suppress movement of the sealing portion, the sealing portion may be restrained from being easily unfolded even if an internal pressure occurs in the battery cell.

As set forth above, in the battery module according to an exemplary embodiment, even if flames occur in any one battery cell, battery cells of another cell group are prevented from being directly exposed to the flame, while gas is discharged externally. Therefore, it is possible to suppress the spread of flame or heat.

While exemplary embodiments have been shown and described above, it will be apparent to those skilled in the art that modifications and variations could be made without departing from the scope of the present disclosure as defined by the appended claims.

For example, in the aforementioned exemplary embodiment, a case in which the flame retardant cover is disposed to encase the battery cell stack is taken as an example, but various modifications may be made, such as configuring to encase each battery cell one by one.

In addition, each of the exemplary embodiments may be implemented in combination with each other.

What is claimed is:

1. A battery module comprising:
   at least one cell group; and
   a case accommodating the at least one cell therein,
   wherein the at least one cell group includes:
   at least one battery cell stack formed by stacking a plurality of battery cells;
   a flame retardant cover coupled to the battery cell stack to encase both side surfaces and an upper portion of the battery cell stack; and
   a flame retardant member disposed between an upper surface of the battery cell stack and the flame retardant cover and formed of a porous material,
   wherein the case includes:
   a first plate disposed below the at least one cell group and forming a base of the case disposed under the battery cell stack and a second plate disposed above the at least one cell group, and
   wherein the at least one battery cell stack is disposed in an insulation space formed by the flame retardant cover and the first plate, and
   wherein the flame retardant cover extends from the first plate forming the base of the case under the battery cell stack, extends along both of the side surfaces of the battery cell stack, and extends over the flame retardant member.

2. The battery module of claim 1,
   wherein the flame retardant cover includes side surface portions coupled to both side surfaces of the battery cell stack and an upper surface portion connecting the two side surface portions and disposed on the upper portion of the battery cell stack, and
   wherein at least one gas outlet is provided on the upper surface portion of the flame retardant cover.

3. The battery module of claim 2, wherein the at least one gas outlet is disposed in a region facing to an electrode lead of the battery cell.

4. The battery module of claim 3, wherein the upper surface portion includes a protrusion protruding in a direction in which the electrode lead of the battery cell is disposed, and the at least one gas outlet is disposed in the protrusion.

5. The battery module of claim 1, wherein the flame retardant cover is formed of a sheet including mica.

6. The battery module of claim 1, wherein the flame retardant cover is formed of any one selected from the group consisting of stainless steel, graphite, graphene, carbon fiber reinforced plastics (CFRP), glass fiber reinforced plastics (GFRP), and non-woven compressible fibers.

7. The battery module of claim 1, wherein the flame retardant member is formed as a foam pad including mica.

8. The battery module of claim 1, wherein the flame retardant member is disposed in a compressed volume state between the battery cell and the flame retardant cover, and pressure is exerted on the battery cell through a restoring force of the flame retardant member.

9. The battery module of claim 8, wherein
   the battery cell includes an accommodating portion accommodating an electrode assembly and sealing portions disposed along a circumference of the accommodating portion, and
   at least one of the sealing portions is pressurized by the flame retardant member and is in close contact with the accommodating portion.

10. The battery module of claim 2,
    the second plate is disposed above the flame retardant cover and facing the upper surface portion of the flame retardant cover, and
    the second plate includes at least one discharge hole for discharging gas formed in the battery cell.

11. The battery module of claim 10, wherein the at least one discharge hole is disposed to not overlap with the gas outlet.

12. The battery module of claim 1, further comprising a heat transfer member disposed between the at least one battery cell stack and the first plate.

13. The battery module of claim 12, wherein the heat transfer member includes any one of thermal grease, a thermally conductive adhesive, and a thermally conductive pad.

* * * * *